US011780358B2

(12) United States Patent
Keiser et al.

(10) Patent No.: US 11,780,358 B2
(45) Date of Patent: Oct. 10, 2023

(54) SYSTEMS AND METHODS FOR PROVIDING PORTABLE CONTAINERS TO USERS OF VEHICLE SERVICES

(71) Applicant: Ford Global Technologies, LLC, Dearborn, MI (US)

(72) Inventors: Lynn Valerie Keiser, San Carlos, CA (US); Yun Ho Lee, Pleasanton, CA (US)

(73) Assignee: Ford Global Technologies, LLC

( * ) Notice: Subject to any disclaimer, the term of this patent is extended or adjusted under 35 U.S.C. 154(b) by 1415 days.

(21) Appl. No.: 16/040,887

(22) Filed: Jul. 20, 2018

(65) Prior Publication Data
US 2020/0023764 A1    Jan. 23, 2020

(51) Int. Cl.
| | |
|---|---|
| *B60P 1/64* | (2006.01) |
| *G06Q 10/0631* | (2023.01) |
| *G06Q 50/30* | (2012.01) |
| *G06Q 10/0835* | (2023.01) |
| *G06Q 10/0833* | (2023.01) |
| *G06Q 30/0601* | (2023.01) |

(52) U.S. Cl.
CPC .......... *B60P 1/6418* (2013.01); *B60P 1/6409* (2013.01); *G06Q 10/06311* (2013.01); *G06Q 10/0833* (2013.01); *G06Q 10/0835* (2013.01); *G06Q 50/30* (2013.01); *G06Q 30/0633* (2013.01)

(58) Field of Classification Search
CPC .................. B60P 1/6418; B60P 1/6409; G06Q 10/06311; G06Q 10/0833; G06Q 10/0835; G06Q 50/30
See application file for complete search history.

(56) References Cited

U.S. PATENT DOCUMENTS

| | | | | |
|---|---|---|---|---|
| 10,657,486 B1 * | 5/2020 | Wolter | ............... | G06Q 10/0833 |
| 2003/0040944 A1 * | 2/2003 | Hileman | ................ | G06Q 10/08 |
| | | | | 705/5 |
| 2012/0226434 A1 * | 9/2012 | Chiu | ................ | G08G 1/096838 |
| | | | | 701/117 |

(Continued)

FOREIGN PATENT DOCUMENTS

| | | |
|---|---|---|
| CN | 105702020 A | 6/2016 |
| CN | 106952064 A | 7/2017 |

(Continued)

OTHER PUBLICATIONS

Hao Wang, Location Recommendation in Location-based Social Networks using User Check-in Data, p. 364-366 (Year: 2013).*

*Primary Examiner* — Ibrahim N El-Bathy
(74) *Attorney, Agent, or Firm* — Brandon Hicks; Eversheds Sutherland (US) LLP

(57) ABSTRACT

Systems and methods are disclosed for providing portable containers for users of vehicle services. In an embodiment, a method includes associating a portable container with a user. The method also includes providing a plurality of storage areas disposed about a geographic area. The plurality of storage areas are configured to temporarily store the portable container. The method also includes receiving a request to pick up the portable container from one of the plurality of storage areas. In addition, the method includes delivering, by way of a vehicle service, the portable container to a user location, a specified location, a different storage area of the plurality of storage areas, or a carrier vehicle.

16 Claims, 9 Drawing Sheets

(56) References Cited

U.S. PATENT DOCUMENTS

| | | | | |
|---|---|---|---|---|
| 2015/0120094 A1* | 4/2015 | Kimchi | ............. | G06Q 30/0641 |
| | | | | 701/3 |
| 2015/0310532 A1* | 10/2015 | Gura | ..................... | G06Q 50/30 |
| | | | | 705/26.8 |
| 2016/0189098 A1* | 6/2016 | Beaurepaire | ........ | H04W 12/084 |
| | | | | 705/337 |
| 2016/0364823 A1* | 12/2016 | Cao | .................... | G01C 21/3438 |
| 2017/0124510 A1* | 5/2017 | Caterino | ............ | G07C 9/00309 |
| 2018/0068139 A1* | 3/2018 | Aalund | ................ | G06K 7/1413 |
| 2019/0392371 A1* | 12/2019 | Kline | ................... | G06Q 10/083 |
| 2021/0272463 A1* | 9/2021 | Jia | ......................... | G06Q 50/30 |

FOREIGN PATENT DOCUMENTS

| | | |
|---|---|---|
| CN | 107491917 A | 12/2017 |
| CN | 107609947 A | 1/2018 |

\* cited by examiner

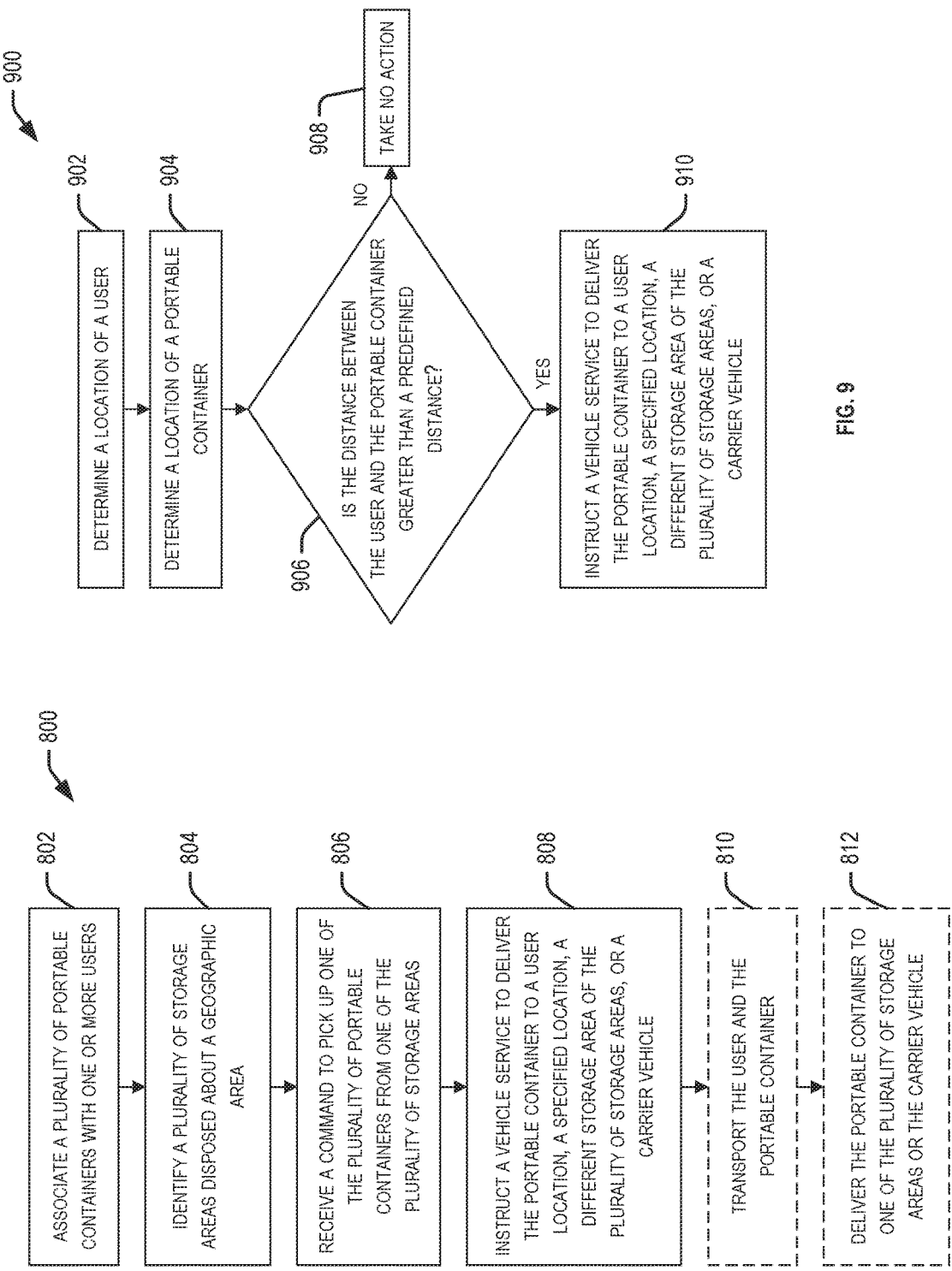

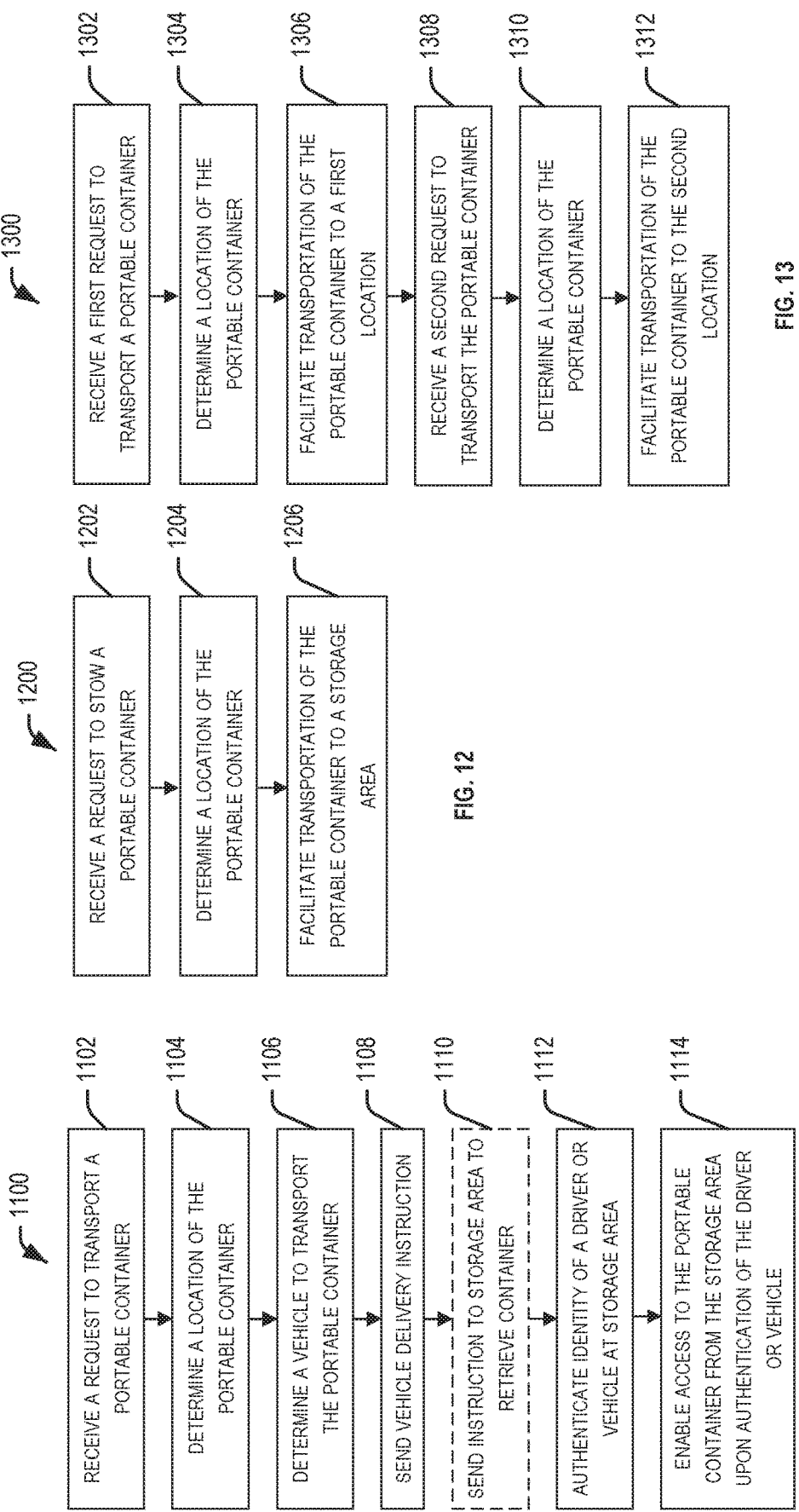

SYSTEMS AND METHODS FOR PROVIDING PORTABLE CONTAINERS TO USERS OF VEHICLE SERVICES

FIELD OF THE DISCLOSURE

The disclosure generally relates to vehicle services, and more particularly relates to systems and methods for providing portable containers to users of vehicle services.

BACKGROUND

If individuals use a ride sharing service for routine transportation, they lose the convenience of having their belongings with them. For example, with a privately owned vehicle (or rented vehicle), an individual can carry things in the trunk that the person may want to have available at a later time and place as needed, such as clothing, sunglasses, pet supplies, a laptop, items purchased while shopping, etc. Keeping these types of items in the trunk of a privately owned vehicle (or rented vehicle), which is parked nearby wherever the individual happens to drive, is very convenient.

A ride sharing service, such as Uber®, Lyft®, or Chariot®—whether shared or single-occupant—does not provide users with the convenience of carrying all of their belongings with them. The items may be too bulky, too heavy, or too risky to carry around all day. For example, an individual may spend the day on the golf course then may want to go for a meal at a restaurant. If using his or her own vehicle, the person would simply drive from the golf course to the restaurant and leave the golf clubs in the trunk. After dinner, the individual would simply drive home with the clubs in the trunk. Users do not have this convenience with a shared vehicle. That is, it is not practical for an individual using Uber® or the like to bring golf clubs, or several bulky bags of purchased items, into a restaurant.

As another example, a business traveler who attends meetings and other functions in unfamiliar cities may decide to get something to eat before heading back to the hotel. In such instances, the business traveler may be carrying a laptop and one or more bags. With nowhere to put these items, they are typically set beside the table during dinner at the restaurant. In one unfortunate scenario, upon finishing dinner, the individual may call for an Uber® or the like and walk outside to meet it, but halfway back to the hotel discover that his or her laptop was left at the restaurant. After a hasty U-turn back to the restaurant, the laptop may or may not be there. With a privately owned (or rented vehicle), the user could have simply put the laptop in the trunk and gone to dinner, reasonably sure that it would still be there when he or she returned.

Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 8 depicts a flow diagram in accordance with one or more embodiments of the disclosure.

FIG. 9 depicts a flow diagram in accordance with one or more embodiments of the disclosure.

FIG. 11 depicts a flow diagram in accordance with one or more embodiments of the disclosure.

FIG. 12 depicts a flow diagram in accordance with one or more embodiments of the disclosure.

FIG. 13 depicts a flow diagram in accordance with one or more embodiments of the disclosure.

DETAILED DESCRIPTION

Overview

Figure 1:
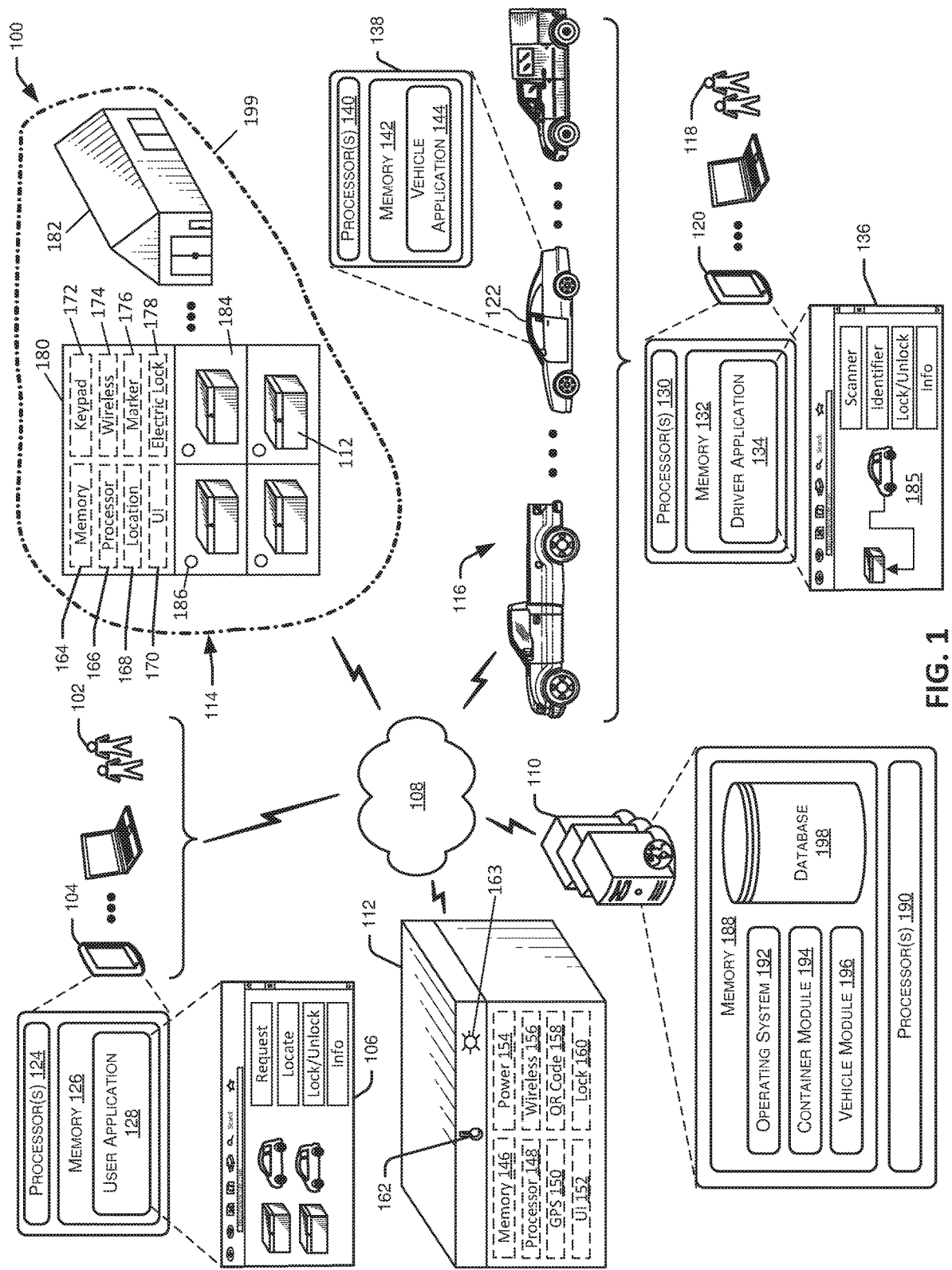
FIG. 1 depicts an illustrative architecture in accordance with one or more embodiments of the disclosure.

The disclosure is related to systems and methods for providing portable containers to users of vehicle services. For example, the portable containers may be located in any one of a number of storage areas about a geographic area. Users may request that the portable containers be delivered by the vehicle services to their location or elsewhere on demand or at a specified time and date. For example, users may interact via an app or the like on a mobile device (or other computing device) with one or more servers associated with a platform to transmit, receive, and/or otherwise interact with the platform to request that the portable containers be delivered by the vehicle services to their location or elsewhere on demand or at a specified time and date. That is, in some instances, the platform may facilitate the portable containers being delivered to, accompanying, and/or following the users around via the vehicle services. In other instances, the platform may facilitate the portable containers being delivered to a specific location at a specific time upon request regardless of the location of the user. For example, the users may interact via the app on the mobile device with the platform servers to request that the portable containers be delivered to a specific location at a specific time upon request regardless of the location of the user. In either instance, the platform may facilitate the portable containers being re-stowed at the storage areas until the next time the portable containers are requested by the users or relocated by the platform. The cost to the user for transporting the personal containers may vary depending on the time and demand of the service provided by the platform.

In one embodiment, the users may own or rent a portable container through the platform. For example, a user may interact with a user interface associated with the platform via the user's mobile device to rent or buy a portable container, which may be delivered to the user, or the user may be given instructions via the mobile device on where to find the portable container at the nearest storage area. In this manner, the platform may include a number of portable containers for sale or rent.

In some instances, a portable container may be delivered to, accompany, and/or follow a user around via a vehicle service. In some instances, the vehicle service may comprise a ride sharing service or the like. Example ride sharing services include Uber®, Lyft®, Chariot®, etc. In other instances, the vehicle service may comprise a container delivery service that is not a ride sharing service. That is, the container delivery service may only transport the portable containers and not the user. Any suitable vehicle service may be used. The vehicle service may be part of the platform or integrated into the platform. That is, the platform and vehicle service may be integrated together, or the platform may be a separate service that works in conjunction with the vehicle service. For example, the platform servers may communicate over a network with one or more servers associated with the vehicle services to coordinate the transportation and storage of the portable containers.

The portable containers may be temporarily stored in one of a number of storage areas around a geographic area. The storage areas may be any suitable size, shape, or configuration. The storage areas may provide a secure place to stow the portable containers. In some instances, the storage areas may comprise secure storage depots, warehouses, depositories, caches, racks, lockers, mobile storage areas, or combinations thereof of varying shapes and sizes. In one example, the storage areas may be racks where the portable containers are inserted and locked in place. These types of storage areas may provide users with the ability to access their portable containers without requesting a portable container transfer. In some instances, the storage areas may be mobile. For example, the storage areas may comprise vehicles, such as cars, cargo vans, trucks, trailers, etc., that roam certain portions of the geographic area. In some instances, the storage areas may be temperature controlled (for example, refrigerated).

In certain embodiments, the storage areas may be accessible by the user via a security code or the like. That is, the user may enter a storage area facility or cargo area to access his or her portable container or unlock his or her portable container from a rack upon the authentication of the user's identity. The lock on the storage area may be biometric (for example, facial recognition, fingerprint, iris scan, etc.) or require the user to enter a pin. In some instances, the user may enter a pin or biometric identifier via an app on a mobile device associated with the user, which may be wirelessly communicated to the storage area to unlock the storage area. In some instances, the user may receive a pin (for example, via a text message) on the mobile device, which may be entered into a keypad or the like at the storage area. In other instances, bringing the mobile device within proximity of the storage area may unlock the storage area. For example, the mobile device may communicate with the storage area using Bluetooth, near-field communication (NFC), Wi-Fi, or Wi-Fi direct or over a network, over which the pin, code, or biometric information may be communicated to the storage area.

The storage area may include indicia or other indicators (for example, a blinking light) to direct the user to his or her portable container. For example, when the user requests the location of the portable container via his or her mobile device, the mobile device may communicate with the storage area to cause the storage area to identify the location of the portable container and generate a visible and/or audible marker (for example, a light on a shelf and/or an audible beep) at the location of the portable container in the storage area. In some instances, the user may request the location of the portable container via his or her mobile device, which may send a signal to the portable container directly or via a network, which may cause the portable container to generate a visible or audible marker. For example, the portable container may include a blinking light or a beeping sound. In other instances, the app on the mobile device may inform or direct the user to the location of his or her portable container. For example, the mobile device may include instructions and/or a map to guide the user to the portable container.

The geographic area may be any suitable size, shape, or configuration. For example, the geographic area may be a city, a county, a metro area, a state, a country, or combinations thereof. The storage areas may be strategically located about the geographic area. Any number of storage areas may be used. Homes, shopping areas, storage units, warehouses, parking garages, and workplaces, etc., may include storage areas for securely holding the portable containers.

The portable containers may be any suitable size, shape, or configuration. In some instances, the portable containers may be sized and shaped to fit within a trunk, a bed, or a cargo area of a vehicle of the vehicle service. The portable containers may be secure. That is, access to the portable container may be restricted via a lock. In some instances, the lock may be biometric (for example, facial recognition, fingerprint, iris scan, etc.) or require the user to enter a pin into a keypad or user interface on the portable container. In some instances, the user may enter a pin or biometric identifier via an app on a mobile device associated with the user, which may be wirelessly communicated to the portable container to unlock the portable container. For example, the mobile device may communicate with the portable container using Bluetooth, near-field communication (NFC), Wi-Fi, or Wi-Fi direct or over a network, over which the pin, code, or biometric identifier may be communicated to the portable container. In some instances, the user may receive a pin (for example, via a text message) on the mobile device, which may be entered into a keypad or user interface on the portable container. In other instances, bringing the mobile device within proximity of the portable container may unlock the portable container. For example, the portable container may include a radio, that is, a transceiver or the like, including an antenna, for establishing a wireless connection with the user device, and/or for otherwise detecting the proximity of the user to the portable container.

The portable containers may include indicia or other indicators (for example, a blinking light) to direct the user to his or her portable container. For example, when the user requests the location of the portable container via his or her mobile device, the mobile device may communicate with the portable container directly or via a server over a network to cause the portable container to generate a visible and/or audible marker (for example, a light on the portable container and/or an audible beep). In some instances, the portable containers may include a power supply (for example, a battery) in communication with a controller (for example, processer and memory), the lock, a scanner, a user interface, a GPS unit, and/or the visible or audible marker, etc., which power supply may be rechargeable (for example, via solar panels). The power supply may also be rechargeable when the portable container is stowed in the storage area. For example, the storage area may include a docketing station for recharging the power supply of the portable container. In this manner, the portable containers may be plugged into an outlet or charged wirelessly while stowed in the storage areas.

The user may own the portable container or rent it for a period of time (for example, while on vacation or a business trip or for a one-time use). In some instance, the portable container may be co-owned or co-rented by family, friends, coworkers, etc. In certain embodiments, only authorized portable containers may be used. In other instances, the user may supply his or her own portable container.

In certain embodiments, a user of the platform may request a vehicle via the vehicle service. For example, the users may interact via an app or the like on a mobile device (or other computing device) with one or more servers associated with the platform to transmit, receive, or otherwise interact with the platform to request a vehicle. In some instances, the vehicle may include a driver. In such instances, the driver may interact with the platform via an app or the like on a mobile device (or other computing device) that is in communication with the platform via the platform servers to transmit, receive, or otherwise interact with the platform. In other instances, the vehicle may be autonomous. In such instances, the autonomous vehicle may include hardware and software in communication with the platform over a network to transmit, receive, or otherwise interact with the platform servers. In yet other instances, the vehicle may be a drone, such as an unmanned aerial vehicle.

The user may request that the vehicle bring the user's portable container. In this manner, the vehicle (whether it includes a driver or is autonomous) may first pick up the portable container associated with the user from the storage area where it is located before picking up the user. In this way, when the vehicle arrives at the user's location, the vehicle may have the portable container associated with the user. At this point, the user may insert or retrieve items from the portable container. In other instances, the vehicle may pick up the user and then pick up the portable container. In either instance, the user may then ride to his or her destination with the portable container in tow.

Once at the user's destination, the user may insert or retrieve items from the portable container. In some instances, the user may keep the portable container at his or her destination. In other instances, the user may indicate to the vehicle service via the platform that the portable container be re-stowed in one of the storage areas. In such instances, the vehicle may take the portable container to the same or a different storage area for stowage thereof. For example, the vehicle may take the portable container to the nearest storage area. In other instances, the vehicle may take the portable container to the storage area nearest a specific location, such as the user's home, work, or future destination.

This process may be repeated indefinitely. That is, the next time the user uses the vehicle service, the user may request that the vehicle bring his or her portable container, in which case the vehicle may pick up the portable container associated with the user from the storage area before picking up the user, or vice versa.

In another embodiment, the portable container may be delivered to the user via a vehicle service, such as a container delivery service. This embodiment is similar to the previous embodiment; however, in this embodiment, the container delivery service is not a ride sharing service. That is, the container delivery service may only pick up and/or deliver the portable container upon request to the user's location, a specified location, or a storage area in real time or at a later time and date.

In one example embodiment, the portable container could be stored in one of a number of storage areas strategically located around a city. The portable container could be carried from one place to another by the vehicles of the ride sharing service or the container delivery service. For example, a user may go shopping and acquire several bags of items. After shopping, the user may wish to continue on to dinner at a different location. The user may request that a vehicle of a ride sharing service bring the user's portable container to store the shopping items therein and then take the user to a destination for dinner. In this manner, the vehicle of the ride sharing service would first fetch the user's portable container from a storage area, install the portable container into the vehicle, and then pick up the user. Upon pickup, the user could put his or her purchased items into the portable container. Upon dropping the user off, the vehicle would temporarily install the portable container in a nearby storage area.

In some instances, after dinner, the user could take a ride sharing service home, and the portable container could be delivered to the storage area nearest the user's home at a later time and date. In other instances, after dinner, the user could request another vehicle from the ride sharing service, which would first go to the storage area and pick up the user's portable container that was previously dropped off. The vehicle would then pick up the user at the restaurant with the user's portable container in tow. Upon dropping off the user at home, for example, the user could remove the shopping items from the portable container and/or put additional things into the portable container. The vehicle could then go to the nearest storage area and drop off the user's portable container. The next day, the same user could request another vehicle from the ride sharing service to first pick up the user's portable container from the storage area before meeting the user if the user requests access to his or her portable container. This process could be repeated indefinitely.

In other instances, the platform may track the location of the user and/or the portable container. For example, the platform could determine a location of the user and/or the portable container. That is, the user may have an app associated with the platform on a mobile device which includes or accesses location data from the mobile device, such as a GPS component of the mobile device or the like. Similarly, the portable container may include a tracking device, such as a GPS receiver or the like. In other instances, the location of the portable container may be logged as it is picked up and/or dropped off at various storage areas. Furthermore, the vehicle of the vehicle service may include GPS or the like. In this manner, the user could track in real time the location of his or her portable container. In some instances, the platform may detect if the user is located at a distance from the portable container that is greater than a predefined distance. If so, the platform may generate a command to the vehicle service to pick up and deliver the portable container to a storage area closer to the user's location in order to ensure that the portable container is readily available by the user upon request.

In some instances, the portable container may be moved via one or more carrier vehicles. The carrier vehicles may be other vehicles of the vehicle service. That is, if the platform detects that the user is located at a distance from the portable container that is greater than a predefined distance, the portable container may be automatically loaded onto a carrier vehicle and moved to a storage area near the user. In other instances, if the platform detects that the portable container is located at a distance from a specific location that is greater than a predefined distance, the portable container may be automatically loaded onto a carrier vehicle and moved to a storage area near the specific location. In some instances, the portable container may be relayed from one location to another via a number of carrier vehicles.

In certain embodiments, a user may request that the portable container be delivered to a location at a specific time and place. In such instances, a carrier vehicle may pick up the portable container and deliver it to the location (for example, a storage area at or near the location), or a number of carrier vehicles may coordinate a series of pickups and drop-offs of the portable container such that it eventually arrives at the intended destination.

In another example embodiment, users may have items shipped to a storage area. The items may be placed in a portable container for safe storage thereof. The user may then request that the portable container be delivered to his or her location or to a specific location at a specific time via the vehicle service. For example, if users are out of town, they may have all of their mail and/or online deliveries delivered to their portable containers located at a storage area. Upon their return, the users may request that the portable containers be delivered to their homes in order to access their mail and/or online deliveries.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Turning now to the drawings, FIG. 1 depicts an illustrative architecture 100 in which techniques for providing the systems and methods disclosed herein may be implemented. The illustrative architecture 100 may include a number of users 102 (utilizing one or more computing devices 104), one or more platform computers 110, one or more portable containers 112, one or more storage areas 114, one or more vehicle services 116 comprising one or more vehicle computing devices 138, and/or one or more drivers 118, if present, utilizing one or more driver devices 120. The vehicle services 116 also may include a number of vehicles 122, some of which may include the vehicle computing devices 138. All of the various components may interact with one another directly and/or over one or more networks 108. For example, in some instances, all of the various components may access, receive from, transmit to, or otherwise interact with one another directly and/or over the networks 108 to provide the portable containers 112 to the users 102 of vehicle services 116.

The networks 108 may include any one or a combination of multiple different types of networks, such as cable networks, the Internet, wireless networks, and other private and/or public networks. In some instances, the networks 108 may include Bluetooth, cellular, near-field communication (NFC), Wi-Fi, or Wi-Fi direct. The described techniques may equally apply in instances where the users 102 interact with the various components via a personal computer, over the phone, via a kiosk, or in any other manner. It is also noted that the described techniques may apply in other client/server arrangements (for example, set-top boxes, etc.), as well as in non-client/server arrangements (for example, locally stored software applications, etc.).

In certain embodiments, the users 102 may utilize the computing devices 104 to access a user application interface 106 (for example, an app or website) that may be provided by, created by, or otherwise associated with a platform (such as the platform described above) via the networks 108. In some instances, the computing devices 104 may be configured to present or otherwise display the user application interface 106 to the users 102.

In some aspects, the user application interface 106 may allow the users 102 to access, receive from, transmit to, or otherwise interact with the platform via the platform computers 110. In addition, the user application interface 106 may allow the users 102 to access, receive from, transmit to, or otherwise interact with, the portable containers 112, the storage areas 114, the vehicle services 116 via the vehicle computing devices 138, and/or the drivers 118 via the driver devices 120.

The user devices 104 and the driver devices 120 may be any type of computing devices including, but not limited to, desktop personal computers (PCs), laptop PCs, mobile phones, smart phones, personal digital assistants (PDAs), tablet PCs, game consoles, set-top boxes, wearable computers, e-readers, web-enabled TVs, cloud-enabled devices and work stations, and the like. In some instances, each user device 104 may be equipped with one or more processors 124 and a memory 126 to store applications and data, such as a user application 128 that may display the user application interface 106. Similarly, each driver device 120 may be equipped with one or more processors 130 and a memory 132 to store applications and data, such as a driver application 134 that may display a driver application interface 136 on the driver devices 120.

The platform computers 110 may be any type of computing devices such as, but not limited to, mobile, desktop, and/or cloud computing devices, such as servers. The platform computers 110 may include one or more servers, perhaps arranged in a cluster, as a server farm, or as individual servers not associated with one another. Other server architectures may also be used to host the platform computers 110. The platform computers 110 may be equipped with one or more processors 190 and a memory 188, which may include an operating system 192 and one or more application programs or services for implementing the features disclosed herein including a container module 194, a vehicle module 196, and/or a database 198.

In some instances, user account data associated with a user 102 may be stored on the platform computers 110 in the database 198. The user account data may include a user profile. For example, the user profile may include personal information associated with the user 102, such as identification information, addresses, payment information, user preferences, etc. The user account data may also include information that associates each user 102 with one or more user devices 104. The users 102 may access his is their account data via the user application interface 106 on the user devices 104 or a website hosted by the platform computers 110.

In some instances, the vehicle services 116 may include one or more vehicle computing devices 138 configured to access, receive from, transmit to, or otherwise interact with the platform computers 110, the user devices 104, the portable containers 112, the storage areas 114, and/or the driver devices 120 via the networks 108. In some instances, the vehicle computing devices 138 may comprise third-party computing devices, such as servers or the like, associated with the vehicle services 116, such as Uber®, Lyft®, or Chariot®, etc. In other instances, each of the vehicles 122 of the vehicle services 116 may include a vehicle computing device 138. Each vehicle computing device 138 may be equipped with one or more processors 140 and a memory 142 to store applications and data, such as a vehicle application 144. In this manner, the vehicle services 116 may be implemented via the vehicle computing device 138 at the vehicles 122, on the driver devices 120, and/or remotely on a server.

The portable containers 112 may include a computing device or the like equipped with one or more processors 148 and a memory 146. Each of the portable containers 112 also may include a tracking device 150 (for example, GPS or the like) to determine a location of the portable containers 112, a user interface 152, a power supply 154, a wireless transceiver 156, a machine-readable optical label (for example, a QR code 158 or the like), an electronic lock 160, and a visual or audible marker 163, all of which may be in communication with the memory 146 and the processors 148. In other instances, the portable container 112 may include an RFID tag. The portable container 112 may also include a nonelectric lock 162. In addition, the portable container 112 may include additional security features, such as a hardened locking panel, a camera, an alarm, etc. In some instances, the visual or audible marker 163 may function as an alarm if tampering is detected by the portable container 112, e.g., if a user enters an incorrect code too many times.

In some instances, a user 102 may access his or her portable container 112 via the user interface 152 on the portable container 112. For example, a user 102 may press a virtual button or enter a code into the user interface 152 on the portable container 112 to unlock the electronic lock 160. In other instances, the user 102 may press a virtual button or enter a code into the user application interface 106 of the user device 104 to unlock the electronic lock 160. In other instances, the portable container 112 may sense that the user device 104 is nearby via the wireless transceiver 156 (for example, via Bluetooth, cellular, near-field communication (NFC), Wi-Fi, or Wi-Fi direct) and unlock the portable container 112. In some instances, the location of the user 102 (which may be determined using GPS functionality on the user device 104) may be transmitted over the network to the portable container 112, which may unlock the electronic lock 160 once the user is within a certain distance. In certain embodiments, the platform may transmit (either directly or over the network 108) a code or message to the user device 104 to access the portable container 112. The code or message may be entered into the user application interface 106 on the user device 104 or the user interface 152 on the portable container 112. In certain embodiments, the user 102 may simply unlock the lock 162 with a key. Any means may be used to lock and unlock the portable containers 112.

The visual or audible marker 163 on the portable container 112 may direct the user 102 to his or her portable container 112. For example, when the user 102 requests the location of the portable container 112 via the user device 104, the user device 104 may communicate with the portable container 112 directly or over a network 108 to cause the portable container 112 to generate a light or an audible sound. In other instances, the user application interface 106 may include a map or the like to direct the user 102 to the location of the portable container as determined via the tracking device 150 (for example, a GPS receiver). The visual or audible marker 163 may activate once the user device 104 is within a certain distance of the portable container 112. Similarly, the driver 118 may activate the visual or audible marker 163 when picking up a portable container 112. For example, the driver device 120 may communicate with the portable container 112 directly or over a network 108 to cause the portable container 112 to generate a light or an audible sound. In other instances, the driver application interface 136 may include a map 185 or the like to direct the driver 118 to the location of the portable container as determined via the tracking device 150 (for example, a GPS receiver). The visual or audible marker 163 may activate once the driver device 120 is within a certain distance of the portable container 112.

The storage area 114 may be located within a geographic area 199. The geographic area 199 may be any suitable size, shape, or configuration. For example, the geographic area may be a city, a county, a metro area, a state, a country, or combinations thereof. The storage areas 114 may be strategically located about the geographic area 199. Any number of storage areas 114 may be used. Homes, shopping areas, storage units, warehouses, parking garages, and workplaces, etc., may include storage areas for securely holding the portable containers 112. The boundaries of the geographic area 199 may be periodically redrawn, expanded, or contracted depending on the demand for services provided by the platform.

The storage areas 114 may include a controller or the like equipped with one or more processors 166 and a memory 164. Each of the storage areas 114 also may include a tracking device 168 (for example, a GPS receiver or the like) to determine a location of the storage area 114 (in instances where the storage area 114 is mobile), a user interface 170, a keypad 172, a wireless transceiver 174, a visual or audible marker 176 (for example, a light or speaker), and an electronic lock 178, all of which may be in communication with the processor 166 and the memory 164. The storage area 114 may also include a nonelectric lock.

In some instances, the storage area 114 may comprise a depot 182, such as a warehouse or the like. In other instances, the storage area 114 may comprise a rack 180 or the like. The rack 180 may include one or more lockers 184 for stowing one or more portable containers 112 therein. In some instances, each locker 184 may include a sensor/scanner 186 or the like for sensing or capturing data indicative of the presence of a portable container 112 therein. For example, the sensor/scanner 186 may detect and scan (that is, read) the QR code 158 (and/or other optical code or codes) or an RFID tag on the portable container 112 when the portable container 112 is inserted or removed from the locker 184. In some instances, the QR code 158 may be located on multiple sides of the portable container 112 to facilitate scanning thereof. This information may be communicated back to the container module 194 via the network 108 for tracking and logging the location of the portable containers 112.

In certain embodiments, a user 102 or a driver 118 may access the storage area 114 via the user interface 170. In some instances, the user 102 or the driver 118 may only be able to access a single locker 184 at a time. In other instances, the user 102 or the driver 118 may be able to access the entire storage area 114 without restriction. For example, a user 102 may press a virtual button or enter a code into the user interface 170 or keypad 172 of the storage area 114 to unlock the electronic lock 178, which may be associated with the storage area 114 as a whole or an individual locker 184. In other instances, the user 102 may press a virtual button or enter a code into the user application interface 106 on the user device 104 or the driver 118 may press a virtual button or enter a code into the driver application interface 136 on the driver device to unlock the electronic lock 178. In other instances, the portable container 112 may sense that the user device 104 or the driver device 120 is nearby via the wireless transceiver 174 (for example, via wireless communications, such as Bluetooth) and unlock the storage area 114. In some instances, the location of the user 102 or the driver 118 (for example, determined via GPS on the user device 104 or the driver device 120) may be transmitted over the network to the storage area 114, which may unlock the electronic lock 178 once the user is within a certain range. In certain embodiments, the wireless transceiver 174 may transmit (either directly or over the network 108) a code or message to the user device 104 or the driver device 120 to access the storage area 114. The code or message may be entered into the user application interface 106, the driver application interface 136, or the user interface 170 on the storage area 114. In certain embodiments, the user 102 or the driver 118 may simply unlock the storage area 114 with a physical or virtual key. Any means may be used to lock and unlock the portable containers 112 from the storage area 114 or gain access to the storage area 114.

In certain embodiments, the container module 194 and the vehicle module 196 may be configured to facilitate the transfer of the portable containers 112. For example, the vehicle module 196 may find and match drivers 118 and vehicles 122 with requests from user devices 104 to transfer a portable container 112. In some instances, the container module 194 may log transfers to determine the location of the portable containers 112, which may be stored in the database 198. In addition, the location of the portable containers 112 may be determined via the tracking device 150, and said locations may be periodically logged in the database 198. Furthermore, the container module 194 and the vehicle module 196 may be configured to schedule future transfers. For example, the vehicle module 196 may contact drivers 118 via the vehicle services 116 to schedule future pick-ups and drop-offs of the portable containers 112.

In some instances, the user 102 may interact with the user application interface 106 to provide personal information (including payment information) to the platform or the vehicle services 116, to locate the portable container 112, to request a vehicle 122, to request a transfer of his or her portable container 112, to lock or unlock access to a storage area 114, to lock or unlock his or her portable container 112, and/or to review information associated with his or her portable container 112 or a platform profile, which may be stored on the database 198. Similarly, the driver 118 may interact with the driver application interface 136 to locate a portable container 112 via the platform computers 110. For example, the driver application interface 136 may receive from the host platform computers 110 a map or map data and/or or generate a map with directions to the portable container 112 based on information stored in the database 198. The driver application interface 136 also may enable the driver 118 to lock or unlock access to the storage area 114 in which the portable container is located (as discussed above), scan in the portable container 112 upon pick-up to inform the container module 194 that the driver 118 has picked up the portable container 112, and scan out the portable container 112 upon being dropped off to inform the container module 194 that the driver 118 has dropped off the portable container 112, whether with the user 102 or at another storage area 114. In this manner, the host computer platform 110 may control and monitor who has access to the portable container 112 during the transfer.

In some instances, for example, when using autonomous vehicles, the vehicles 122 may include the above described functionality. For example, the driver application 134 may be part of an autonomous vehicle driving system. In some instances, the vehicle 122 may include a tracking device (for example, GPS) for tracking the location of the vehicle 122. More so, the vehicle 122 may include a scanner/sensor/camera or the like for capturing identifying information about the container 112, such as by reading an optical code, such as the QR code 158, or sensing an RFID tag of the portable container 112, for scanning in and scanning out the portable container 112. For example, the QR code 158 may be scanned by the vehicle 122 to indicate that the portable container 112 has been loaded into the vehicle 122. Likewise, the QR code 158 may be scanned upon unloading of the portable container 112 from the vehicle 122. All of this information may be communicated to the container module 194 and stored in the database 198 in order to track the location of the portable container 112.

In one example embodiment, a user 102 may request a ride from a vehicle 122 of one of the vehicle services 116. For example, the user 102 may request the vehicle 122 via the user application interface 106. That is, the user 102 may select an option presented on the user application interface 106 to request a vehicle 122, and the vehicle module 196 may communicate with the platform computers 110 via the vehicle application 144 and/or one of the driver applications 134 to facilitate a ride for the user 102. The user 102 may also request that the vehicle 122 bring the user's portable container 112. In this manner, the platform computers 110 may locate the portable container 112, determine the size of the portable container 112 (and other portable container attributes), which all may be stored in the database 198). Based on these factors, the platform computers 110 may determine the most efficient way to transfer the portable container 112. For example, the container module 194 may determine a location of the portable container 112 as stored in the database 198. The location of the portable container 112 may be communicated to the vehicle application 144 and/or the driver application 134. In this manner, the vehicle 122 may pick up the portable container 112 associated with the user 102 from the storage area 114 where it is located before picking up the user 102, or vice versa. In some instances, when the vehicle 122 arrives at the user's location, the vehicle 122 may have the portable container 112 associated with the user 102. The user 102 may then ride to his or her destination with the portable container 112 in tow.

Once arriving at the user's destination, the user 102 may keep the portable container 112, or the user 102 may request that the vehicle 122 re-stow the portable container 112 in one of the storage areas 114. This process may be repeated indefinitely. That is, the next time the user 102 uses the vehicle services 116, the user 102 may request that the vehicle 122 bring the portable container 112, in which case the vehicle 122 may pick up the portable container 112 from the storage area 114 before picking up the user 102, or vice versa.

In another embodiment, the portable container 112 may be delivered to the user 102 via a vehicle service 116 that is not a ride sharing service, such as a container delivery service. That is, the container delivery service may pick up and/or deliver the portable container 112 upon request by the user 102 via the user application interface 128 to the user's location, a specified location, or a storage area in real time or at a later specified time. This embodiment is similar to the ones described above; however, in this embodiment, the user 102 does not accompany the portable container 112 as it is being transferred by the vehicle 122.

Figure 2:
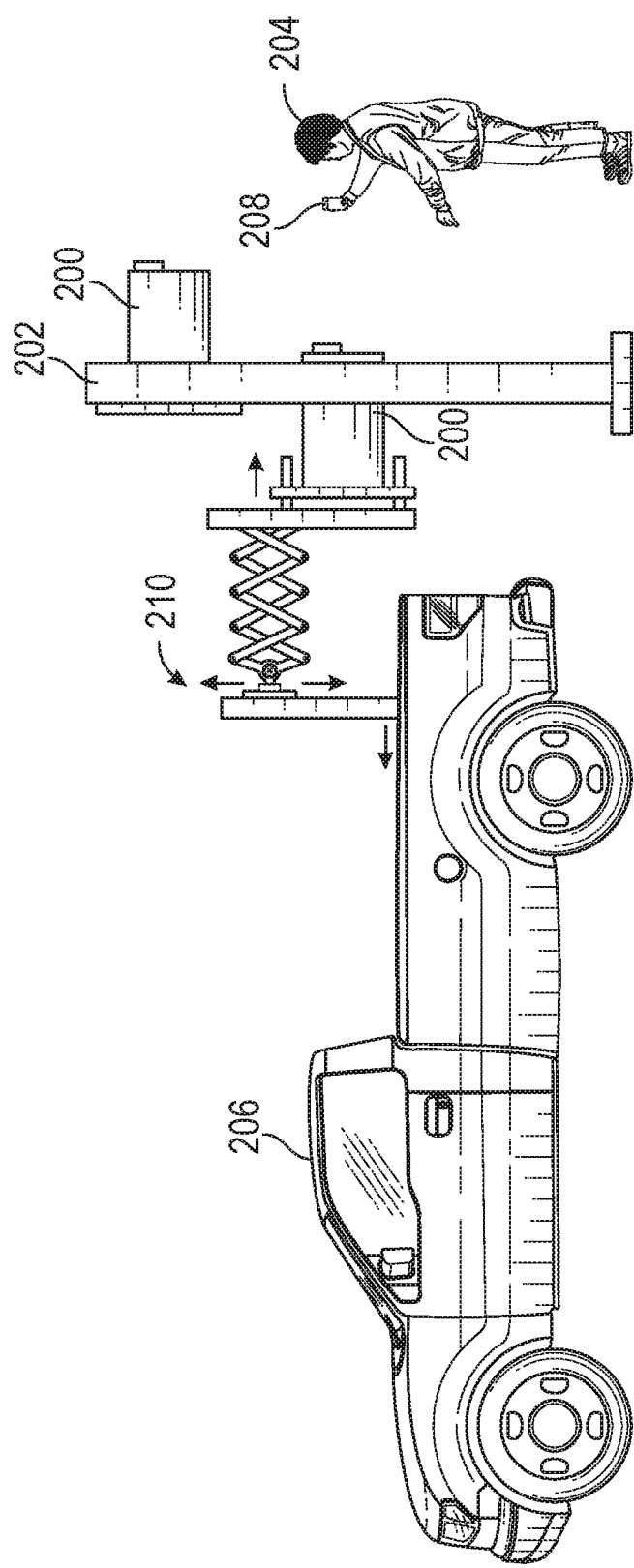
FIG. 2 depicts a portable container disposed in a storage area in accordance with one or more embodiments of the disclosure.

FIG. 2 depicts an embodiment in which the portable container 200 may be delivered to or removed from a storage area (for example, a rack 202 near the user 204) via a manipulator 210. The manipulator 210 may be associated with a vehicle 206 and/or the rack 202. The manipulator 210 may be a robotic arm, a winch, a pulley system, a crane, etc., or a combination thereof. The manipulator 210 may include any number of mechanical systems capable of maneuvering the portable container 200 to and from the rack 202. In some instances, the manipulator 210 may remove the portable container 200 from the rack 202 and place the portable container 200 in the vehicle 206. In other instances, at the end of a ride, for example, the manipulator 210 may place the portable container 200 in the rack 202. In some instances, the manipulator 210 may be fully automated. That is, upon authentication of the user, which may be a customer of the platform, a driver for the platform, and/or an employee of the platform (for example, a storage area attendant), the manipulator 210 may place a portable container 200 into a vehicle 206. In other instances, the user, driver, or attendant may manually operate the manipulator 210. Any suitable manipulator may be used.

In some instances, the portable container 200 may be securely placed into the rack 202, and the user 204 may access the portable container 200 via a locking panel or the like on the rack 202 or on the portable container 200. In a preferred embodiment, as discussed above, only an authorized vehicle 206 or an authorized user 204 may be able to insert and remove the portable container 200 from the rack 202. For example, the user 204 may be authenticated by entering a password, a code, a biometric identifier, or the like at the rack 202 or into a user device associated with the user. In addition, the user 204 may be authenticated by bringing the user device within proximity of the rack 202 or the portable container 200.

Once the user is authenticated, the user 204 may access (for example, open) the portable container 200 while it is still located in the rack 202, or the portable container 200 may be removed from the rack 202 manually or via the manipulator 210. In such instances, the portable container 200 may be placed in an area adjacent to the rack 202 where the user 204 can open it. In other instances, the portable container 200 may be loaded into a vehicle 206 for transfer.

In certain embodiments, the user 204 may unlock the portable container 200 in one of several ways. For instance, an application associated with a mobile device 208 of the user 204 may allow the user 204 to open his or her portable container 200 associated with the user 204 (for example, using a wireless connection), as discussed above. The user 204 may also use an electronic combination lock that includes a single-use code that may be texted to the user 204 from the platform, or the user 204 may call a phone number and enter a PIN, which in turn may provide the user 204 with a single-use combination code. The portable container 200 may also be unlocked via a user-settable combination code that stays the same as long as the user 204 owns or rents the portable container 200. The user 204 may be able to change the code as desired. As illustrated, the portable container 200 may be locked and unlocked in any suitable manner.

Turning back to FIG. 1, in one example scenario, a user 102 may wish to go shopping and thus may request a vehicle 122 of a vehicle service 116, such as a ride sharing service. In addition, the user 102 may request that the vehicle 122 bring the user's portable container 112. In this manner, the vehicle 122 may fetch the user's portable container 112 from the storage area 114 where the portable container 112 is located and then pick up the user 102 for a ride to the store. In other instances, the vehicle 122 may first pick up the user 102 and then pick up the portable container 112. Next, the vehicle 122 may drop off the user 102 at the store and then place the user's portable container 112 into a nearby storage area 114 (for example, a secure rack 180 at or near the store). After shopping, the user 102 may access the secure rack 180 and put the purchased items into the user's portable container 112, after which the user 102 may request another ride from the ride sharing service to a restaurant. The user 102 may then request that the portable container 112 be sent to his or her home. In such instances, the platform may facilitate a vehicle 122 picking up the user's portable container 112 and delivering it to a storage area 114 (for example, a secure rack 180) near the user's home, or the platform may coordinate a series of pickups and drop-offs of the user's portable container 112 such that it eventually arrives at the secure rack 180 near the user's home. After dinner, the user 102 may take another vehicle 122 via the ride sharing service to go home. Once the user 102 arrives home, the user can access the portable container 112, which is now located at a secure rack 180 near the user's home, and remove the newly purchased items.

In other instances, for added security, the user 102 my request to have the portable container 112 stored at a secure storage area 114, such as a depot or warehouse 182. The user 102 could then request that the portable container 112 be brought to a convenient location so the user 102 can retrieve his or her belongings. Also, the user 102 could request that the portable container 112 be stored in a refrigerated area at the depot, until the user 102 is ready to retrieve the contents of the portable container 112. This may beneficial in the case of shopping for perishables, such as fresh and/or frozen foods.

In some instances, as discussed above, the portable containers 112 may include additional security features, such as a hardened locking panel, a GPS locator beacon via a wireless network (for example, 4G cellular or the like), a tampering alarm, and/or an on-board camera streaming to the Internet, etc. In addition, the portable containers 112 may be powered by a wireless charging system while installed in a rack or at a depot.

FIGS. 3-5 and 7 illustrate example flow diagrams showing processes facilitating the transportation and storage of portable containers, as described above. The processes may, but need not, be implemented by a computing device operated by a platform, such as the platform computers 110. That is, the various components depicted in FIG. 1 may be used to implement the flow diagrams illustrated in FIGS. 3-5 and 7.

Figure 3:
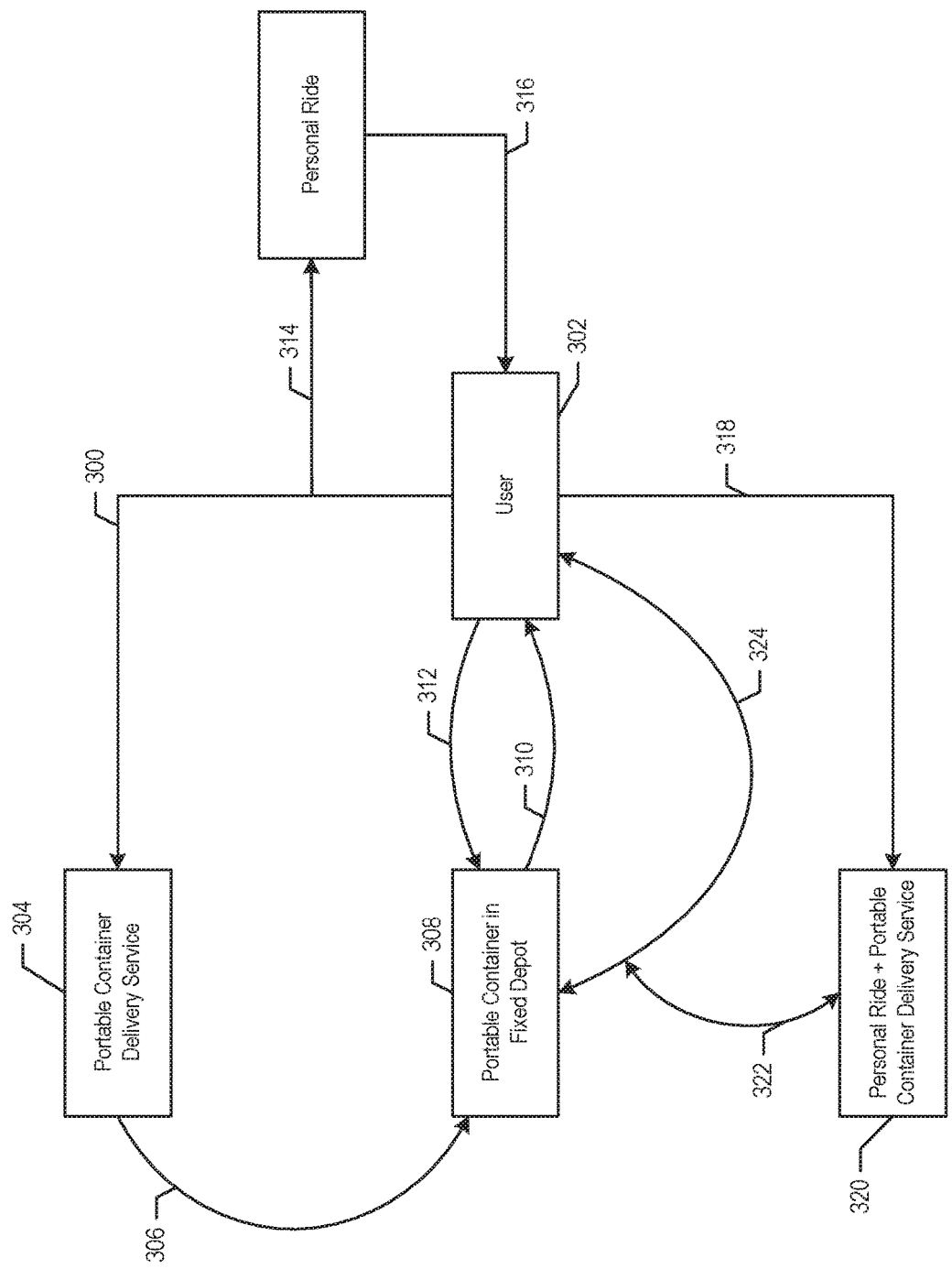
FIG. 3 depicts a flow diagram in accordance with one or more embodiments of the disclosure.

FIG. 3 depicts a flow diagram illustrating one example of how a user might use the platform to transfer a portable container to a desired location. As indicated by line 300, the user 302 may request that the portable container be delivered to a depot or rack nearby the user's current location or to a specific location (for example, near the user's home) via a portable container delivery service 304. The portable container delivery service 304 may then locate the storage area 308 in which the portable container is located and pick up the portable container, as indicated by line 306. Next, as indicated by line 310, the platform may inquire to the user 302 about the portable container delivery (for example, request that the user 302 confirm the request or inform the user 302 that the portable container has been transferred to the desired storage area 308 or other location), and the user 302 may respond to the inquiry, as indicated by line 312, to enable the portable container to be delivered. In some instances, as indicated by line 314, the user may simultaneously or separately request a ride via a ride sharing service separate from or part of the portable container delivery service 304, which may pick up the user, as indicated by line 316. In some instances, the ride sharing service may take the user 302 to the location of the portable container.

In other instances, as indicated by line 318, the user 302 may request both a ride and the portable container via a ride sharing service 320. As indicated by line 322, the ride sharing service 320 may locate and pick up the portable container from the storage area 308. Next, at line 324, the ride sharing service 320 may pick up the user 302. In other instances, the ride sharing service 320 may first pick up the user 302 and then pick up the portable container from the storage area 308. When the portable container is picked up, the platform may inquire to the user 302, as indicated by line 310, about the portable container delivery (for example, request that the user 302 confirm the request or inform the user 302 that the portable container has been transferred to the desired storage area 308 or other location) and the user 302 may respond to the inquiry, as indicated by line 312.

Figure 4:
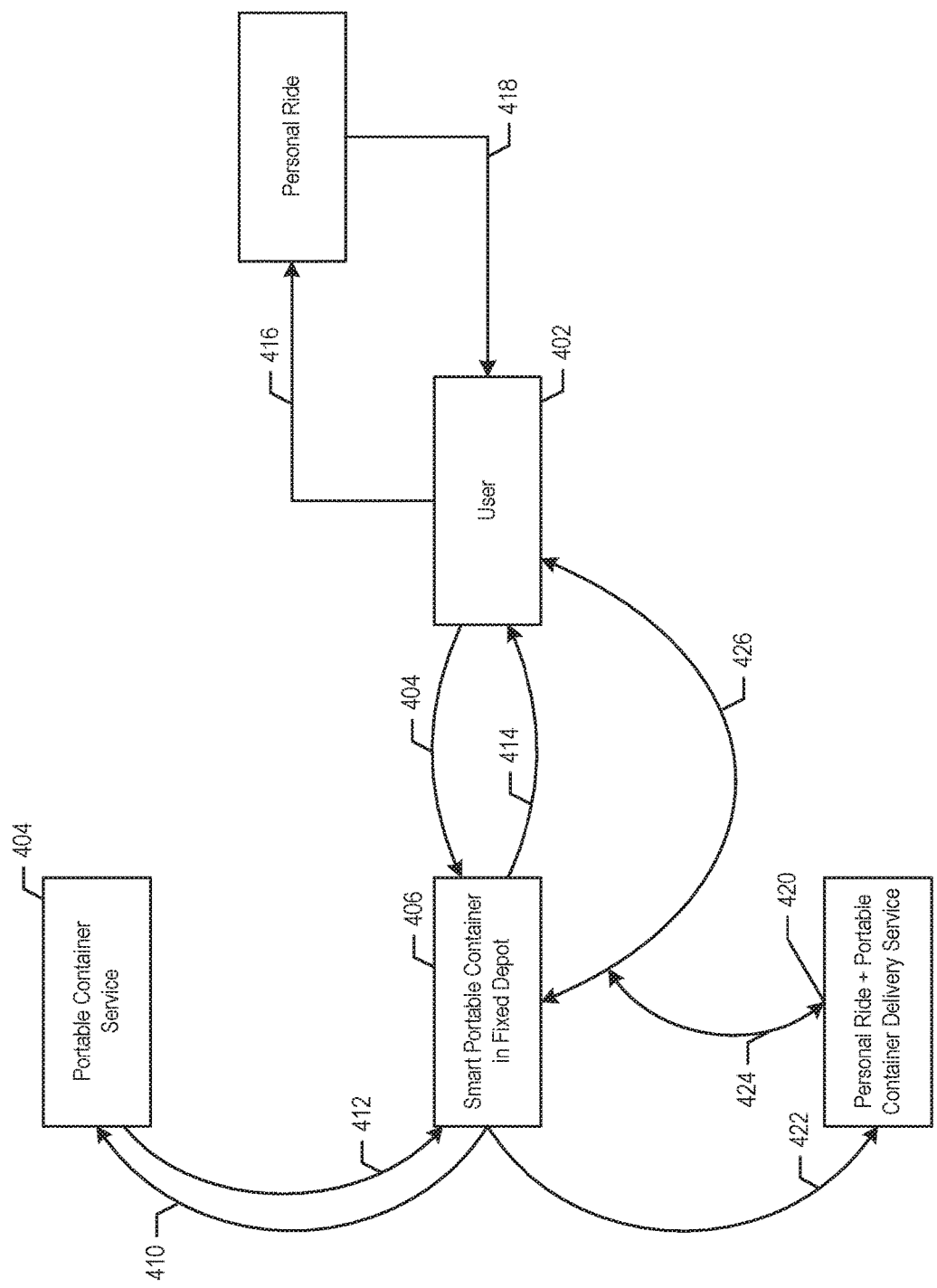
FIG. 4 depicts a flow diagram in accordance with one or more embodiments of the disclosure.

FIG. 4 depicts a flow diagram for a user to use a "smart" portable container. That is, in some instances, the portable container may include a computing device and wireless communication capabilities over a network, as discussed above. As indicated by line 404, a user 402 may request the portable container be delivered to a storage area 406 that is near the user's location, home, workplace, personal vehicle, etc. When the user 402 requests that the portable container be moved to the most convenient nearby storage area 406, the platform (for example, via the smart portable container) may contact a container delivery service 408, as indicated by line 410. The container delivery service 408 may then locate the storage area 406 in which the smart portable container is located and pick up the smart portable container, as indicated by line 412. Next, as indicated by line 414, the smart portable container may inquire to the user 402 about the portable container delivery (for example, request that the user 402 confirm the request or inform the user 402 that the portable container has been transferred to the desired storage area 406 or other location), and the user 402 may respond to the inquiry, again as indicated by line 404. In some instances, as indicated by line 416, the user 402 may simultaneously or separately request a ride via a ride sharing service separate from or as part of the container delivery service 408, which may pick up the user 402, as indicated by line 418. In some instances, the ride sharing service may take the user 402 to the location of the portable container. In some instances, if the user 402 requests a ride, the platform (for example, via the smart portable container) may automatically request that the smart portable container be delivered (or moved) to the user's next location.

In other instances, as indicated by line 404, the user 402 may request a ride and the portable container via a ride sharing service 420. As indicated by lines 422, 424, and 426, the platform (for example, via the smart portable container) may contact the ride sharing service 420 and provide the ride sharing service 420 with the location of the smart portable container. The ride sharing service 420 may pick up the smart portable container from the storage area 406 and then pick up the user 402. In other instances, the ride sharing service 420 may first pick up the user 402 and then pick up the smart portable container from the storage area 406.

In some instances, the portable container may follow the user, if desired. For example, the user may want the portable container to automatically follow the user to a store and then home again after any trip that the user designates as "shopping." In this manner, the user may configure the platform to automatically ensure that the portable container is within a reasonable distance of the user to be readily accessible to the user. In another example, in a work setting, the user may configure the platform to ensure that the portable container is brought from a shop to a worksite every morning (for example, before rush hour), so that the portable container is already on site when the user arrives at the worksite via a ride sharing service or mass transit. The portable container may then follow the user back to the shop each afternoon. This may enable the user to replenish the portable container with tools and other materials at the end of each day, while the portable container is at the shop. The next morning, when the user arrives at the worksite, the portable container may have already been delivered.

Figures 5, 6:
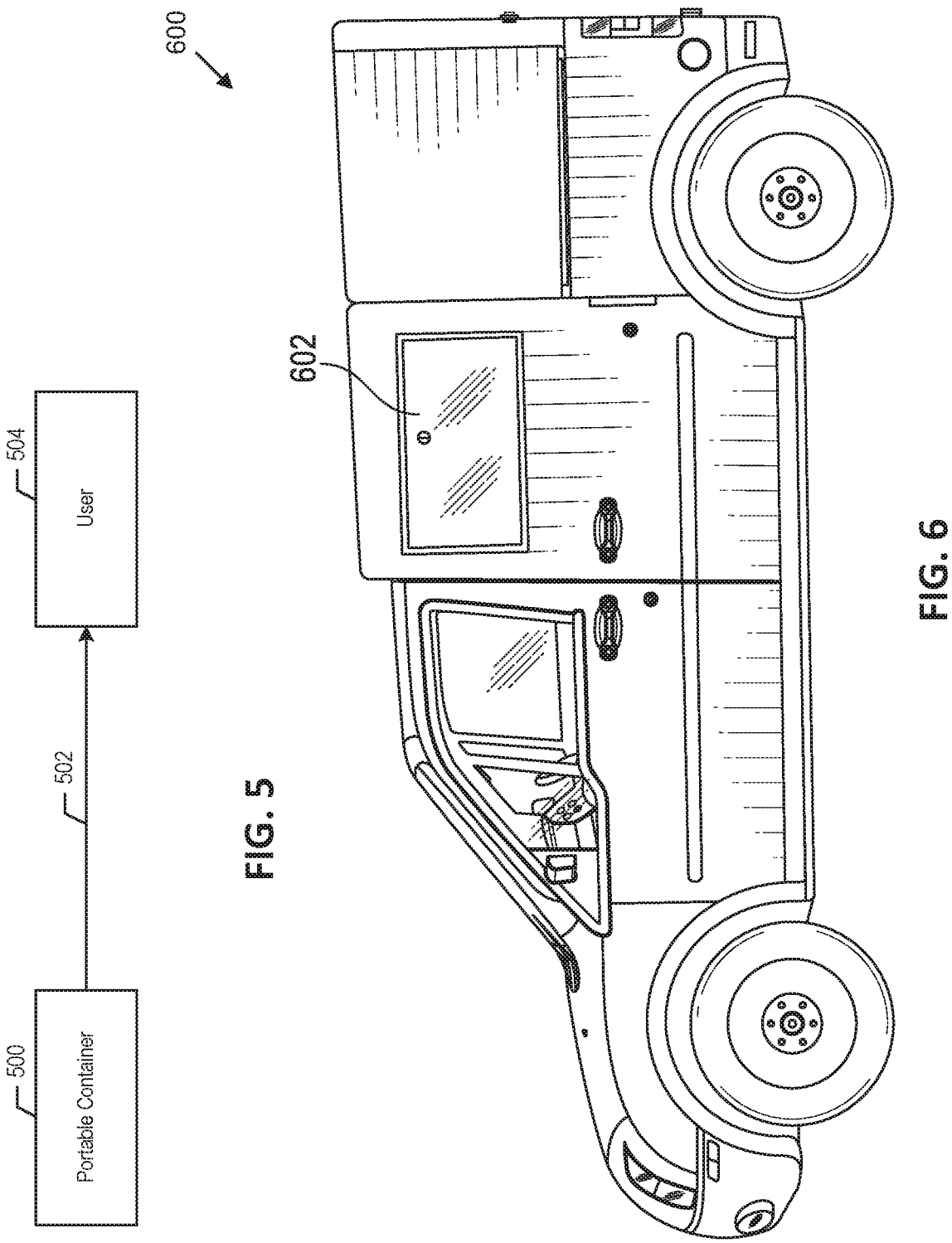
FIG. 5 depicts a flow diagram in accordance with one or more embodiments of the disclosure.
FIG. 6 depicts a vehicle in accordance with one or more embodiments of the disclosure.

In certain embodiments, as depicted in FIG. 5, the platform may be configured to periodically check a distance 502 between the portable container 500 and the user 504 and automatically request that the portable container 500 be moved nearer the user 504, without the user 504 having to manually request a move. That is, the platform may track the location of the user 504 and/or the portable container 500. The platform may detect if the user 504 is located at a distance 502 from the portable container 500 that is greater than a predefined distance. If so, the platform may automatically generate a command to pick up and deliver the portable container 500 to a storage area closer to the user's location in order to ensure that the portable container 500 is readily available to the user 504 upon request. In other instances, if the platform detects that the portable container 500 is located at a distance 502 from a specific location (for example, the user's home) that is greater than a predefined distance, the portable container 500 may be automatically moved to a storage area near the specific location. In some instances, this may be done during down hours, such as at night or during non-peak hours.

FIG. 6 depicts a vehicle 600 capable of transporting one or more portable containers. The vehicle 600 may be a cargo vehicle, a van, a truck, a trailer, a car, etc. In some instances, the portable containers may be inserted into a compartment 602 in the side of the vehicle 600 so that the user can store or retrieve his or her belongings without needing to remove the portable container from the vehicle 600. This type of vehicle may enable the user to access the portable container in instances where no rack is available, nearby racks are full, the portable container needs to be delivered to another place quickly, or there is a carrier vehicle service available. For example the user may open the compartment 602 to access his or her portable container inside. The user may then open the portable container and insert or retrieve items as necessary. When the user is done, the user may close the portable container and the compartment 602, at which point the vehicle 600 may drive away.

Figure 7:
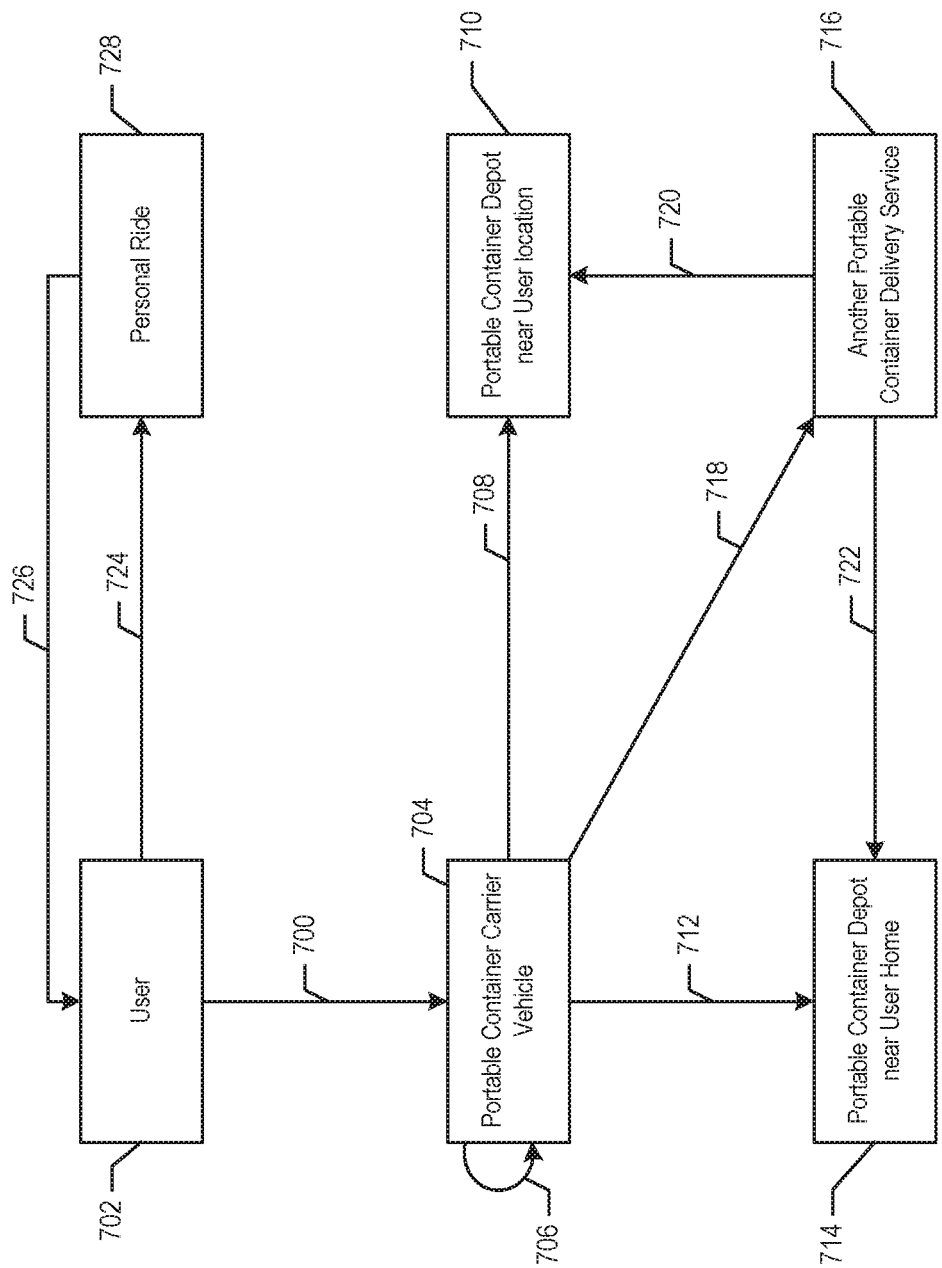
FIG. 7 depicts a flow diagram in accordance with one or more embodiments of the disclosure.

FIG. 7 depicts a flow diagram in which a carrier vehicle is available. For example, as indicated by line 700, a user 702 may deposit a portable container into a carrier vehicle 704. At this point, as depicted by line 706, the carrier vehicle 704 may keep the portable container if there is no request or standing instructions to transport the portable container. In some instances, the platform may instruct the carrier vehicle 704 to deposit the portable container into a storage area in order to free up space within the carrier vehicle 704.

In other instances, as depicted by line 708, the carrier vehicle 704 may deposit the portable container into a storage area 710 at or near the user's current or intended location. In another instance, as depicted by line 712, the carrier vehicle 704 may deposit the portable container into a storage area 714 at or near the user's home or another specified location.

In certain embodiments, when the requested location is beyond the range of the carrier vehicle 704, the carrier vehicle 704 may transfer the portable container to another carrier vehicle 716, as indicated by line 718. Any number of transfers may be used to move the portable container to its intended destination. As depicted by line 720, the subsequent carrier vehicle 716 may deposit the portable container into the storage area 710 at or near the user's current or intended location or, as depicted by line 722, the subsequent carrier vehicle 716 may deposit the portable container into the storage area 714 at or near the user's home or another specified location. Furthermore, when the requested location is beyond the range of the subsequent carrier vehicle 716, the subsequent carrier vehicle 716 may transfer the portable container to another carrier vehicle. Any number of carrier vehicles may be used to transport the portable container to its intended destination.

In some instances, as indicated by line 724, the user 702 may simultaneously or separately request a ride via a ride sharing service 728, which may pick up the user 702, as indicated by line 726. In some instances, the ride sharing service 728 may take the user 702 to the location of the portable container. In some instances, if the user 702 requests a ride, the platform may automatically request that the portable container be delivered (or moved) to the user's next location via the carrier vehicles.

Illustrative Processes

Figure 10:
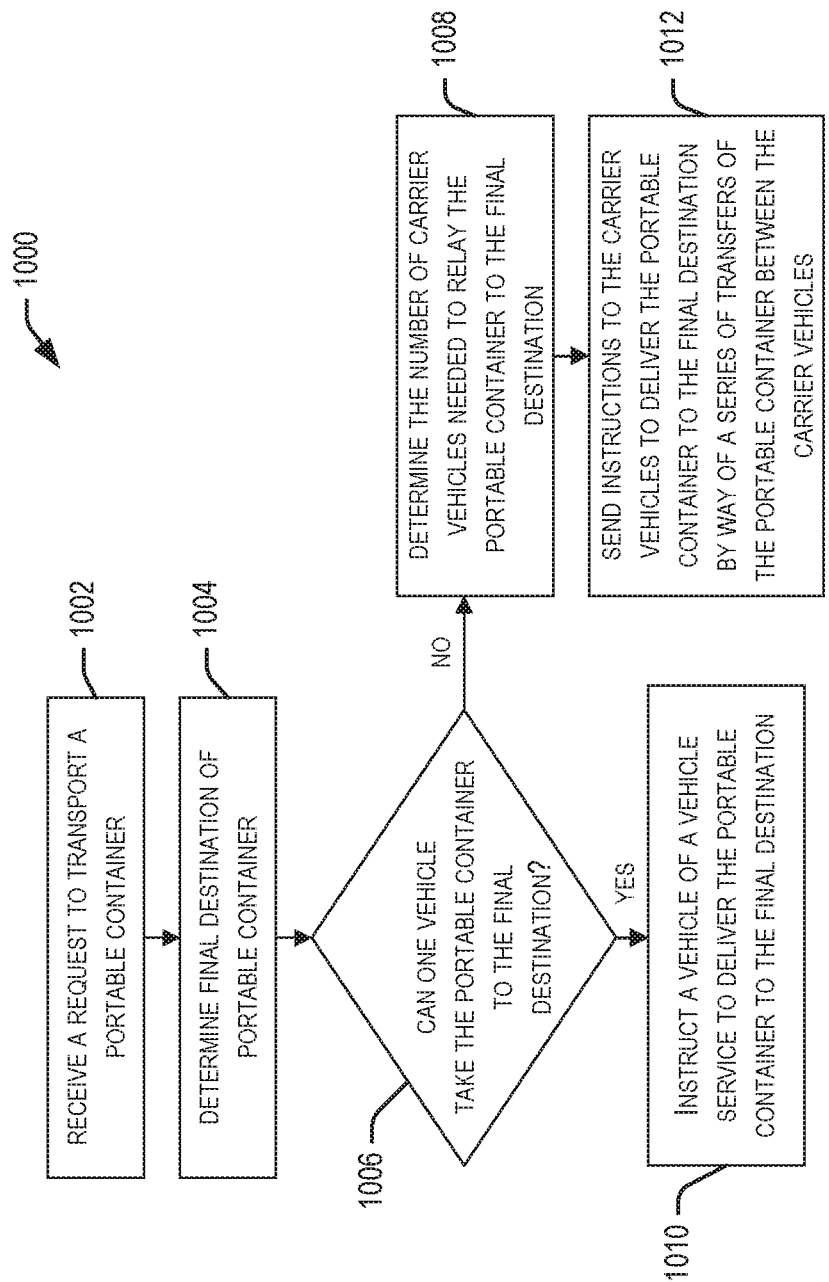
FIG. 10 depicts a flow diagram in accordance with one or more embodiments of the disclosure.

FIGS. 8-10 illustrate example flow diagrams showing processes facilitating the transportation and storage of portable containers, as described above. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The processes may, but need not, be implemented by a computing device operated by a platform, such as the platform computers 110. In some aspects, the process 800 may begin by associating a plurality of portable containers with one or more users at block 802. For example, users of the platform may buy or rent a portable container and provide the platform with personal information, including identifying information and/or payment information. In this manner, the platform may associate a user of the platform with a particular portable container. In some instances, a user of the platform may have multiple portable containers matched with his or her account.

At block 804, the process may identify a plurality of storage areas disposed about a geographic area. As noted above, the storage areas may be configured to temporarily store one or more of the portable containers therein. The storage areas may provide a secure place to stow the portable containers.

A command to pick up one of the portable containers from one of the storage areas may be received at block 806. For example, a user may request that his or her portable container be delivered by a vehicle service to his or her location or elsewhere on demand or at a specified time and date in the future. In one example, the user may also request a ride from the vehicle of the vehicle service. In this manner, the vehicle service may be a ride sharing service or the like. In other instances, the request may be made to a container delivery service, which may only pick up and/or deliver the portable container upon request to the user's location, a specified location, or a storage area in real time or at a later time and date. In some instances, the request may be recurring. That is, the user may set up the request to automatically happen via a user preference.

At block 808, the process 800 may include instructing a vehicle service to deliver the portable container to a user location, a specified location, a different storage area, or a carrier vehicle. In this manner, a vehicle (whether it includes a driver or not) of the vehicle service may pick up the portable container associated with the user from the storage area where it is located. In some instances, the vehicle (or the driver of the vehicle) may have to provide confirmation that the vehicle or driver is authorized to pick up the portable container from the storage area. Once the portable container is picked up, the vehicle service may deliver the portable container to a user location, a specified location, a different storage area, or a carrier vehicle.

In certain embodiments, after the portable container is delivered to the user at block 808, the user and the portable container may be transported together to a destination at block 810. For example, the vehicle service may be a ride sharing service. In this manner, when the vehicle arrives at the user's location with the portable container, the user may insert or retrieve items from the portable container, and the user may then ride to his or her destination with the portable container in tow.

In some instances, the user may keep the portable container at his or her destination. In other instances, at block 812, the user may indicate to the vehicle service via the platform that the portable container be re-stowed in one of the storage areas. In such instances, the vehicle may take the portable container to the same or a different storage area for stowage thereof. For example, the vehicle may take the portable container to the nearest storage area. In other instances, the vehicle may take the portable container to the storage area nearest a specific location, such as the user's home or future destination. This process may be repeated indefinitely. That is, the next time the user uses the vehicle service, the user may request that the vehicle bring his or her portable container, in which case the vehicle may pick up the portable container associated with the user from the storage area before picking up the user, or vice versa.

FIG. 9 illustrates a flow diagram showing the process 900 for facilitating the transportation and storage of portable containers if located outside of a predefined distance from a user, as described above. At block 902, the process may begin by determining the location of a user. In some instances, the location of the user may be determined via GPS associated with a mobile device of the user. In other instances, the user may enter his or her location into the platform via the mobile device. Next, at block 904, the process may determine a location of a portable container associated with the user. For example, the portable container may include a tracking device (for example, GPS or the like) to determine a location of the portable container. Other methods of determining the location of the portable container may be used. For example, the location of the portable container may be logged as it is picked up and dropped off at various storage areas. In some instances, at block 906, the platform may determine if the user is located a distance from the portable container that is greater than a predefined distance. If not, no action is taken at block 908. That is, the portable container is left in its current location. If yes, at block 910, the platform may instruct the vehicle service to pick up and deliver the portable container to the user's location, a specific location (for example, the user's home or work), a storage area closer to the user's location in order to ensure that the portable container is readily available by the user upon request, or to a carrier vehicle.

FIG. 10 illustrates a flow diagram showing the process 1000 for facilitating the transportation and storage of portable containers via one or more carrier vehicles, as described above. At block 1002, the process may begin by receiving a request to transport a portable container. For example, a user may request that his or her portable container be delivered by a vehicle service to his or her location or elsewhere on demand or at a specified time and date in the future. At block 1004, the process 1000 may determine the final destination of the portable container. The final destination may be the user's current location, intended future location, another storage area, or a specific location, such as the user's home, work, etc. Next, the platform may determine if a single vehicle of the vehicle service will be able to transfer the portable container to the final destination within a suitable time frame at block 1006. If yes, at block 1010, then the platform may instruct a vehicle of the vehicle service to pick up and deliver the portable container to the final destination. If no, then the platform may determine the number of carrier vehicles needed to relay the portable container to the final destination at block 1008. In such instances, at block 1012, a number of carrier vehicles may coordinate a series of pickups and drop-offs of the portable container such that it eventually arrives at the final destination.

FIG. 11 illustrates a flow diagram showing the process 1100 for facilitating the transfer of a portable container via one or more vehicles, as described above. At block 1102, the process may begin by receiving a request to transport a portable container. The platform may determine a location of the portable container at block 1104. The platform may then determine a vehicle to transport the portable container at block 1106. The vehicle may be determined based on a number of factors, including the location of the vehicle relative to the portable container, the size of the portable container, the capacity of the vehicle (that is, can the portable container fit within the vehicle), the range of the vehicle, fuel prices, traffic, etc. Next, the platform may send vehicle delivery instructions to the vehicle at block 1108. The instructions may include navigation instruction (such as a map and/or step-by-step directions). The instructions also may include access information for accessing a storage area to retrieve the portable container, such as access codes or the like. In addition, the instructions may include location information regarding the location of the portable container within the storage area. The instructions also may include user identification information so that the driver of the vehicle (or the autonomous vehicle) can confirm the identity of the user if the portable container is dropped off with the user. In some instances, at block 1110, the platform may send instructions to the storage area ahead of the arrival of the vehicle in order to ensure that the vehicle does not have to wait for the portable container to be retrieved from the storage area. At block 1112, the identity of the driver or vehicle may be authenticated. For example, the driver may be required to show identification or present a pass code provided via the driver application interface. For autonomous vehicles, the vehicle may include a readable medium, such as a QR code or RFID, which may be read or sensed upon arrival at the storage area. Upon authentication, at block 1114, the platform may instruct the driver or vehicle on where to access the portable container. For example, the portable container may be unlocked from a rack in the storage area.

FIG. 12 illustrates a flow diagram showing the process 1200 for facilitating the stowage of a portable container via one or more vehicles, as described above. In some instances, a user of the platform may request that his or her portable container be stowed in a storage area at block 1202. For example, the user may request via a mobile device that a vehicle pick up the portable container and stow it in a nearby storage area. In other instances, the user may request the portable container be stowed in a specific storage area, for example, nearby his or her home or workplace. Based on the request, the platform, at block 1204, may determine a location of the portable container. At block 1206, the platform may facilitate the delivery of the portable container to the storage area.

FIG. 13 illustrates a flow diagram showing the process 1300 for facilitating the transfer of a portable container via one or more vehicles, as described above. At block 1302, the process may begin by receiving a first request to transport a portable container to a first location. The platform may determine a location of the portable container at block 1304. For example, the portable container may be located in a storage area. At block 1306, the platform may facilitate the delivery of the portable container to the first location. At block 1308, a second request may be received by the platform to transport the portable container to a second location. The platform may then again determine a location of the portable container at block 1310. Next, the platform may facilitate the delivery of the portable container to the second location at block 1312. This process may be repeated indefinably. That is, a third, fourth, fifth . . . N number of requests and transfers may be made.

EXAMPLES

In some instances, the following examples may be implemented together or separately by the systems and methods described herein.

Example, 1 may include a system, comprising: at least one memory that stores computer-executable instructions; and at least one processor configured to access the at least one memory, wherein the at least one processor is configured to execute the computer-executable instructions to: receive a request from a user device to transfer a portable container and a user, the user device associated with a user account; determine a first location of the portable container; determine a second location of the user device; determine a vehicle of a vehicle service to transfer the portable container to the second location; send first instructions to the vehicle to transfer the portable container to the second location; send, after transferring the portable container to the second location, second instructions to the vehicle to transfer a user associated with the user account and the portable container to a third location; and send, after transferring the portable container and the user to the third location, third instructions to the vehicle to transfer the portable container to a fourth location for storage.

Example 2 may include the system of example 1 and/or some other example herein, wherein the at least one processor is further configured to execute the computer-executable instructions to send, to at least one of the vehicle or the vehicle service, identification information for identifying the portable container in a storage area at the first location.

Example 3 may include the system of example 1 and/or some other example herein, wherein the at least one processor is further configured to execute the computer-executable instructions to send, to at least one of the vehicle or the vehicle service, access information for accessing the portable container from a storage area at the first location.

Example 4 may include the system of example 1 and/or some other example herein, wherein the at least one processor is further configured to execute the computer-executable instructions to receive one or more messages indicating that the portable container has been transferred to the second location, that the portable container and user have been transferred to the third location, and that the portable container has been transferred to the fourth location.

Example 5 may include the system of example 1 and/or some other example herein, wherein the at least one processor is further configured to execute the computer-executable instructions to determine one or more routes to transfer the portable container to the second location.

Example 6 may include the system of example 5 and/or some other example herein, wherein the first instructions to transfer the portable container to the second location comprise navigation instructions.

Example 7 may include the system of example 1 and/or some other example herein, wherein the vehicle comprises a plurality of carrier vehicles configured to transfer the portable container to the second location by a series of transfers of the portable container between the plurality of the carrier vehicles.

Example 8 may include the system of example 1 and/or some other example herein, wherein the at least one processor is further configured to execute the computer-executable instructions to receive, from at least one of the vehicle or the vehicle service, an indication of acceptance of first instructions.

Example 9 may include the system of example 1 and/or some other example herein, wherein the first location of the portable container comprises a storage area, wherein the second location comprises a location of the user, wherein the third location comprises a user destination, and wherein the fourth location comprises the storage area or a different storage area.

Example 10 may include the system of example 1 and/or some other example herein, wherein the location of the portable container is determined by a tracking device associated with the portable container.

Example 11 may include the system of example 1 and/or some other example herein, wherein the location of the user device is determined by a tracking device associated with the user device.

Example 12 may include a system, comprising: at least one memory that stores computer-executable instructions; and at least one processor configured to access the at least one memory, wherein the at least one processor is configured to execute the computer-executable instructions to: determine a first location of a portable container, the first location associated with a first storage area, wherein the storage area is configured to store the portable container for a period of time; determine a second location of a user device; determine a distance between the first location and the second location is greater than a distance threshold; and send instructions to a vehicle service system to transfer the portable container to the second location, a third location different form the second location, a second storage area, or a carrier vehicle.

Example 13 may include the system of example 12 and/or some other example herein, wherein the instructions include instructions to transfer the portable container to the carrier vehicle, wherein the carrier vehicle is a first carrier vehicle, and wherein the first carrier vehicle is configured to deliver the portable container to the second location, the third location, the second container storage area, or a second carrier vehicle.

Example 14 may include a system, comprising: at least one memory that stores computer-executable instructions; and at least one processor configured to access the at least one memory, wherein the at least one processor is configured to execute the computer-executable instructions to: receive a first request to transfer a portable container to a first location; determine a second location of the portable container; determine a first vehicle of a vehicle service to transfer the portable container from the second location to the first location; send first instructions to the first vehicle to transfer the portable container from the second location to the first location; receive, after transferring the portable container from the second location to the first location, a second request to transfer the portable container to a third location; determine a second vehicle of the vehicle service to transfer the portable container from the first location to the third location; and send second instructions to the second vehicle to transfer the portable container from the first location to the third location.

Example 15 may include the system of example 14 and/or some other example herein, wherein the first vehicle and the second vehicle comprise the same or different vehicles.

Example 16 may include the system of example 14 and/or some other example herein, wherein the at least one processor is further configured to execute the computer-executable instructions to send, to at least one of the first vehicle or the vehicle service, identification information for identifying the portable container in a storage area at the second location.

Example 17 may include the system of example 14 and/or some other example herein, wherein the at least one processor is further configured to execute the computer-executable instructions to send, to at least one of the first vehicle or the vehicle service, access information for accessing the portable container from a storage area at the second location.

Example 18 may include the system of example 14 and/or some other example herein, wherein the at least one processor is further configured to execute the computer-executable instructions to receive one or more messages indicating that the portable container has been transferred to the first location and that the portable container has been transferred to the third location.

Example 19 may include the system of example 14 and/or some other example herein, wherein the at least one processor is further configured to execute the computer-executable instructions to determine one or more routes to transfer the portable container to the first location, wherein the first instructions to transfer the portable container to the first location comprise navigation instructions.

Example 20 may include the system of example 14 and/or some other example herein, wherein the first vehicle comprises a plurality of carrier vehicles configured to transfer the portable container to the first location by a series of transfers of the portable container between the plurality of the carrier vehicles.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
at least one memory that stores computer-executable instructions; and
at least one processor configured to access the at least one memory, wherein the at least one processor is configured to execute the computer-executable instructions to:
receive a first request from a user device to transfer a user, the user device and the user associated with a user account, the user account associated with one or more user preferences for storage of a portable container associated with the user;
automatically determine, by a tracking device associated with the portable container, a first location of the portable container, wherein the first location comprises a storage area;
determine a second location of the user, wherein the second location comprises a user pick-up location;
receive a second request from the user device to transfer the portable container, the second request generated, via the user device, by the user or automatically generated, based on the one or more user preferences, the first location, and the second location, by the user device;
determine a vehicle of a vehicle service to transfer the portable container to the second location;
send, responsive to the second request, first instructions to the vehicle to transfer the portable container to the second location;
send, after transferring the portable container to the second location, second instructions to the vehicle to transfer the user and the portable container to a third location, wherein the third location comprises a user destination;
automatically send, after transferring the portable container and the user to the third location, third instructions to the vehicle to transfer the portable container but not the user to a fourth location for storage, the third instructions based at least in part on the one or more user preferences, wherein the fourth location comprises the storage area or a different storage area; and
automatically cause, by a wireless communication comprising at least one of short-range wireless communication, near-field communication (NFC), Wi-Fi communication, and Wi-Fi direct communication between the user device and at least one of the portable container, the storage area, and the different storage area, the at least one of the portable container, the storage area, and the different storage area to unlock.

2. The system of claim 1, wherein the at least one processor is further configured to execute the computer-executable instructions to send, to at least one of the vehicle or the vehicle service, identification information for identifying the portable container in the storage area at the first location.

3. The system of claim 1, wherein the at least one processor is further configured to execute the computer-executable instructions to send, to at least one of the vehicle or the vehicle service, access information for accessing the portable container from the storage area at the first location.

4. The system of claim 1, wherein the at least one processor is further configured to execute the computer-executable instructions to receive one or more messages indicating that the portable container has been transferred to the second location, that the portable container and the user have been transferred to the third location, and that the portable container has been transferred to the fourth location.

5. The system of claim 1, wherein the at least one processor is further configured to execute the computer-executable instructions to determine one or more routes to transfer the portable container to the second location.

6. The system of claim 5, wherein the first instructions to transfer the portable container to the second location comprise navigation instructions.

7. The system of claim 1, wherein the vehicle comprises a plurality of carrier vehicles configured to transfer the portable container to the second location by a series of transfers of the portable container between the plurality of the carrier vehicles.

8. The system of claim 1, wherein the at least one processor is further configured to execute the computer-executable instructions to receive, from at least one of the vehicle or the vehicle service, an indication of acceptance of the first instructions.

9. The system of claim 1, wherein the location of the user is determined by a second tracking device associated with the user device.

10. A system, comprising:
at least one memory that stores computer-executable instructions; and
at least one processor configured to access the at least one memory, wherein the at least one processor is configured to execute the computer-executable instructions to:
receive a first request from a user device associated with a user to transfer a portable container associated with the user to a first location, the user device and the user associated with a user account, the user account associated with one or more user preferences for storage of the portable container, the first request generated, via the user device, by the user or automatically generated, based on the one or more user preferences, the first location, and a second location of the portable container, by the user device, wherein the first location comprises a first pick-up and/or drop-off location, and wherein the second location comprises a first storage area;
automatically determine, by a tracking device associated with the portable container, the second location of the portable container;
determine a first vehicle of a vehicle service to transfer the portable container from the second location to the first location;

send, responsive to the first request, first instructions to the first vehicle to transfer the portable container from the second location to the first location;

receive, after transferring the portable container from the second location to the first location, a second request from the user device to transfer the portable container to a third location, the second request generated, via the user device, by the user or automatically generated, based on the one or more user preferences, the first location, and the third location, by the user device, wherein the third location comprises a second pick-up and/or drop-off location or a second storage area;

determine a second vehicle of the vehicle service to transfer the portable container from the first location to the third location;

send, responsive to the second request, second instructions to the second vehicle to transfer the portable container from the first location to the third location;

automatically send, after transferring the portable container and the user to the third location, third instructions to the second vehicle to transfer the portable container but not the user to a fourth location for storage, the third instructions based at least in part on the one or more user preferences, wherein the fourth location comprises the first storage area, the second storage area or a different storage area; and automatically cause, by a wireless communication comprising at least one of short-range wireless communication, near-field communication (NFC), Wi-Fi communication, and Wi-Fi direct communication between the user device and at least one of the portable container, the first storage area, and the second storage area, the at least one of the portable container, the first storage area, and the second storage area to unlock.

11. The system of claim 10, wherein the first vehicle and the second vehicle comprise the same or different vehicles.

12. The system of claim 10, wherein the at least one processor is further configured to execute the computer-executable instructions to send, to at least one of the first vehicle or the vehicle service, identification information for identifying the portable container in the first storage area at the second location.

13. The system of claim 10, wherein the at least one processor is further configured to execute the computer-executable instructions to send, to at least one of the first vehicle or the vehicle service, access information for accessing the portable container from the first storage area at the second location.

14. The system of claim 10, wherein the at least one processor is further configured to execute the computer-executable instructions to receive one or more messages indicating that the portable container has been transferred to the first location and that the portable container has been transferred to the third location.

15. The system of claim 10, wherein the at least one processor is further configured to execute the computer-executable instructions to determine one or more routes to transfer the portable container to the first location, wherein the first instructions to transfer the portable container to the first location comprise navigation instructions.

16. The system of claim 10, wherein the first vehicle comprises a plurality of carrier vehicles configured to transfer the portable container to the first location by a series of transfers of the portable container between the plurality of the carrier vehicles.

* * * * *